(12) United States Patent
Bisson et al.

(10) Patent No.: US 6,813,413 B2
(45) Date of Patent: Nov. 2, 2004

(54) METHOD AND A SYSTEM FOR PROTECTING DATA TRANSMITTED ON AN OPTICAL RING FORMED OF A SINGLE OPTICAL FIBER

(75) Inventors: Arnaud Bisson, Orsay (FR); Ludovic Noirie, Nozay (FR); Luc Berthelon, Palaiseau (FR)

(73) Assignee: Alcatel, Paris (FR)

( * ) Notice: Subject to any disclaimer, the term of this patent is extended or adjusted under 35 U.S.C. 154(b) by 140 days.

(21) Appl. No.: 10/234,125

(22) Filed: Sep. 5, 2002

(65) Prior Publication Data

US 2003/0059159 A1 Mar. 27, 2003

(30) Foreign Application Priority Data

Sep. 6, 2001 (FR) ............................................. 01 11535

(51) Int. Cl.$^7$ .............................. G02B 6/28; G02F 1/00; G02F 2/00
(52) U.S. Cl. ............................................... 385/24; 398/3
(58) Field of Search ............................. 385/15, 16, 24, 385/27, 31, 39, 48, 95, 96; 398/1–4, 167, 83

(56) References Cited

U.S. PATENT DOCUMENTS

| | | | |
|---|---|---|---|
| 5,612,805 A | * 3/1997 | Fevrier et al. | 398/83 |
| 5,680,235 A | * 10/1997 | Johansson | 398/7 |
| 5,870,212 A | 2/1999 | Nathan et al. | |
| 6,108,466 A | 8/2000 | Aksyuk et al. | |
| 6,539,144 B1 | * 3/2003 | Lu | 385/24 |
| 6,643,055 B1 | * 11/2003 | Askinger et al. | 359/337.12 |
| 2004/0017967 A1 | * 1/2004 | Tajima | 385/24 |

FOREIGN PATENT DOCUMENTS

| | | |
|---|---|---|
| WO | WO 97/01907 A1 | 1/1997 |
| WO | WO 99/03230 A1 | 1/1999 |
| WO | WO 99/65164 A2 | 12/1999 |

OTHER PUBLICATIONS

"Integrated Fiber Optical Switching Element", IBM Technical Disclosure Bulletin, IBM Corp., New York, US, vol. 32, No. 10B, Mar. 1, 1990, pp. 172–174, XP000097846.

* cited by examiner

Primary Examiner—Joseph Williams
Assistant Examiner—Peter Macchiarolo
(74) Attorney, Agent, or Firm—Sughrue Mion, PLLC (57) ABSTRACT

A method is disclosed of reconfiguring a ring optical network made using a single optical fiber (100). A traffic concentrator (120) and stations (140) are optically connected to the fiber. The concentrator sends a light signal to and receives a light signal from both ends of the fiber using two groups of wavelengths (110, 150) in order to be able to communicate with all the stations. When the network is established, a virtual break (170) is created between two stations. If a real break is detected in the optical fiber, then the virtual break is shifted until it coincides with the real break, thereby enabling traffic to be re-established between the concentrator and the stations. Each station is equipped with a three-state optical switch (400) for changing the direction of the light signals.

12 Claims, 6 Drawing Sheets

DIRECT

FIG. 6A

CROSSED

FIG. 6B

IDLE

FIG. 6C

DIRECT

FIG. 7A

CROSSED

FIG. 7B

IDLE

FIG. 7C

METHOD AND A SYSTEM FOR PROTECTING DATA TRANSMITTED ON AN OPTICAL RING FORMED OF A SINGLE OPTICAL FIBER

FIELD OF THE INVENTION

The present invention relates generally to the technology of transmission via optical fibers and more particularly to a system for improving the protection of data transmitted on a low-cost optical ring comprising only one optical fiber.

BACKGROUND

The use of optical fibers for new communication networks has become the norm. This applies in particular to networks known as federator or backbone networks installed by the major network operators, who have been deploying large quantities of these fibers for many years because of the intrinsic advantages associated with transporting data on optical fibers. This is due primarily to the enormous bandwidth that can be used to transport optical signals, which can be modulated at very high frequencies (expressed in gigabits ($10^9$ bits) per second) and which can nevertheless be propagated over long distances. The now generalized use of wavelength division multiplexing (WDM), enabling mixing in the same fiber of light at several different wavelengths, tens of different wavelengths or even hundreds of different wavelengths (in which case the expression dense WDM (DWDM) is used), has commensurately increased the transportation capacity of a single fiber and thus potentially of the network in which the fiber is deployed.

Nevertheless, the possibility of being able to transport enormous quantities of data on a permanent basis makes it essential to protect the data. All businesses, governments, banks and organizations of all kinds who are now using these networks on a permanent basis, and all their activities, including their most critical activities, depend on uninterrupted operation of the network, which means that the network must be able to recover its full functionality in a very short time period in the event of a fault or malfunction. This is the particular reason for the success of ring networks of the synchronous optical network (SONET) and synchronous digital hierarchy (SDH) types, as respectively standardized in North America and Europe, which are for the most part compatible and standardize transmission speeds in the range indicated above, the fastest of which most widely used are 2.48 Gbit/s (SONET OC-48 or SDH STM-16), 10 Gbit/s (SONET OC-192 or SDH STM-64) and even 40 Gbit/s (SONET OC-768 or SDH STM-256). To ensure uninterrupted operation, this type of network comprises a double ring of optical fibers. One is a normally idle protection channel and is used only if the active fiber is broken or is affected by a major malfunction, after fast automatic protection switching (APS), necessitating less than 50 milliseconds, has been carried out to ensure traffic continuity, the essential quality criterion of networks of the above kind that transport enormous quantities of data.

Although techniques of the above type, i.e. WDM and transport protection based on a double ring of fibers, have been installed without difficulty in backbone networks, where their deployment cost is acceptable, the same cannot be said of other types of networks, such as metropolitan area networks, which are closer to the end user and whose deployment and operating costs cannot be shared between as large a number of users. Although the cost of plant for implementing the WDM technique has fallen sharply, opening the door to transporting multiple wavelengths on a single fiber, including in metropolitan area networks, and therefore opening the door to increasing their bandwidth, this generally does not go so far as providing a normally idle back-up fiber to be used only in the event of a fault. Nevertheless, the large number of users of a metropolitan area network, and the equally important activities that require access to the network, have just as great a requirement for protection as backbone networks.

SUMMARY OF THE INVENTION

This is why the object of the invention is to organize a ring network on the basis of a single fiber which, at the same time as allowing the use of new wavelength division multiplexing (WDM and DWDM) techniques to increase the bandwidth and functionality, nevertheless ensures a good level of protection of the data transported on networks in which deployment and operating costs are essential factors and in particular where it is not possible, or not feasible, to include an idle fiber used only in the event of a fault.

The invention therefore consists in a method of reconfiguring a ring optical network formed of a single optical fiber. The ring includes a traffic concentrator and stations optically connected to the fiber. The concentrator sends a light signal using a first group of wavelengths and receives a light signal using a second group of wavelengths, all the wavelengths used being different. The concentrator simultaneously sends to and receives from the stations via both ends of the fiber. When the network is established, a virtual break is created between two of the stations. On detection of a real break in the fiber, the virtual break is shifted so that it coincides with the real break, enabling traffic between the concentrator and the stations to be re-established.

To implement the invention, each station is equipped with a three-state optical switch forming a four-pole network transmitting light signals between its four poles in three operating modes, namely a direct mode, a crossed mode, and a transparent mode that is also the idle mode of the device.

BRIEF DESCRIPTION OF THE FIGURES

The objects, aims, features and advantages of the invention will emerge more clearly on reading the following detailed description of a preferred embodiment of the invention, which is illustrated by the accompanying drawings, in which.

DETAILED DESCRIPTION OF THE INVENTION

Figure 1:
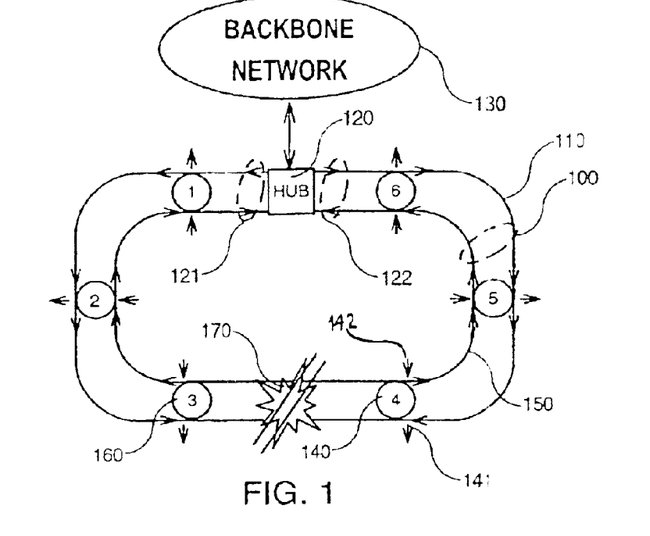
FIG. 1 is a diagram showing a ring network of the invention.

FIG. 1 shows the operating principle of a ring of the invention. As mentioned above, the invention assumes that the ring comprises a single fiber (100), either to limit its cost or because there is only one fiber actually available, on which fiber light nevertheless circulates at two or more wavelengths, generally at wavelengths from two groups of wavelengths, all of which are different. One group (110) of wavelengths $\lambda_T$, generally comprising wavelengths $\lambda_{T1}$, $\lambda_{T2}, \ldots \lambda_{Tn}$, carries downlink traffic, i.e. traffic from a hub (120) or concentrator whose function is firstly to manage the traffic on the ring network of the invention and secondly to interface with other networks, for example a federator or backbone network (130). The concentrator is therefore the access point to the network of the invention. The downlink traffic on the group of wavelengths $\lambda_T$ is addressed to stations on the ring, for example the station (140) numbered 4. Each station is an optical add/drop multiplexer (OADM) station. As the name suggests, each OADM station is adapted, in optical mode, to drop (141) the portion of the traffic that is addressed to it (one or more of the wavelengths from the group $\lambda_T$) and to add (142) its own traffic addressed to the hub, while at the same time allowing all the wavelengths sent and received by the hub to circulate freely. That traffic is added to the other group of wavelengths $\lambda_R$, generally comprising wavelengths $\lambda_{R1}, \lambda_{R2}, \ldots, \lambda_{Rn}$. The traffic from the stations (150) to the hub on wavelengths in the group of wavelengths $\lambda_R$ is referred to as uplink traffic.

To form a ring, the two ends (121) and (122) of the single fiber are connected to respective opposite sides of the hub (120) in this diagrammatic representation of a ring of the invention. The hub is thus supposedly able to send and receive on wavelengths from the respective groups of wavelengths $\lambda_T$ and $\lambda_R$ mentioned above, either from two separate interfaces each receiving one end of the fiber or from a single interface, in which case the ends of the fiber are coupled by means of an appropriate external optical device.

Thus the hub sends and receives wavelengths from the two groups $\lambda_T$ and $\lambda_R$ bidirectionally from both ends of the fiber simultaneously, in opposite directions. According to an essential feature of the invention, a virtual break (170) is created between two stations when the network is set up or reconfigured. This virtual break is preferably between the two stations farthest away from the hub, and therefore between the station (160) numbered 3 and the station (140) numbered 4 in this particular embodiment of the invention. There is no communication between these stations in normal operation.

It will have been noted that a ring of the invention essentially organizes the traffic between the hub and the stations. As described hereinafter, the object is to protect this type of traffic. However, the invention in no way rules out the simultaneous presence of interstation traffic, including traffic between the stations on respective opposite sides of the virtual break (170), although that traffic does not have the same guarantee of protection if the fiber is broken.

Figure 2A:
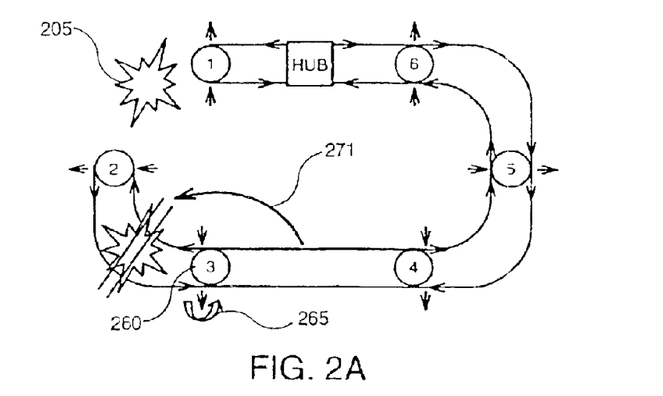
FIGS. 2A and 2B are diagrams showing how the ring network of the invention can be reconfigured if the optical fiber is broken.

FIG. 2A shows the first step of reconfiguring the network if the fiber (205) is broken between the stations numbered 1 and 2 in this example. Once the real break is located, the virtual break is first shifted (271) one step towards the real break, i.e. between the stations numbered 2 and 3. The latter station (260) reverses (265) the direction of the traffic on the ring so that after reconfiguration it circulates between the stations numbered 3 and 4, whereas previously there was no communication over this portion of the fiber.

Figure 2B:
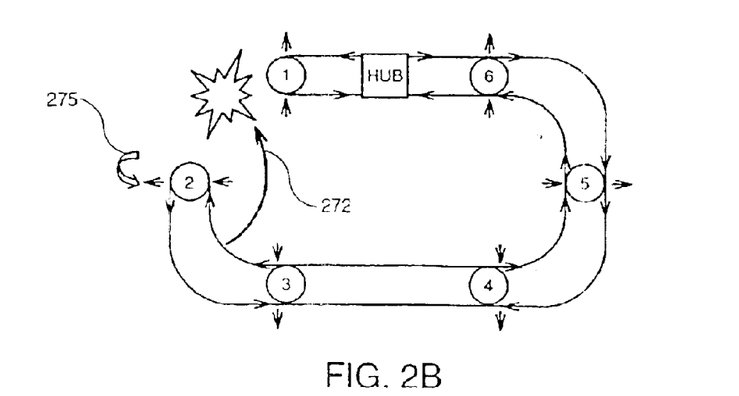

FIG. 2B shows the second and final step of reconfiguration in this particular example of the fiber being broken between stations 1 and 2. The virtual break is shifted (272) by an additional step so that the real break and the virtual break coincide. As in the above first step, the station numbered 2 must reverse (275) the direction of the traffic on the ring so that after reconfiguration it circulates from the station numbered 2 to the station numbered 3.

At this stage, reconfiguration is complete and the hub is again able to send to and receive from all of the stations connected to the ring.

Figure 3A:
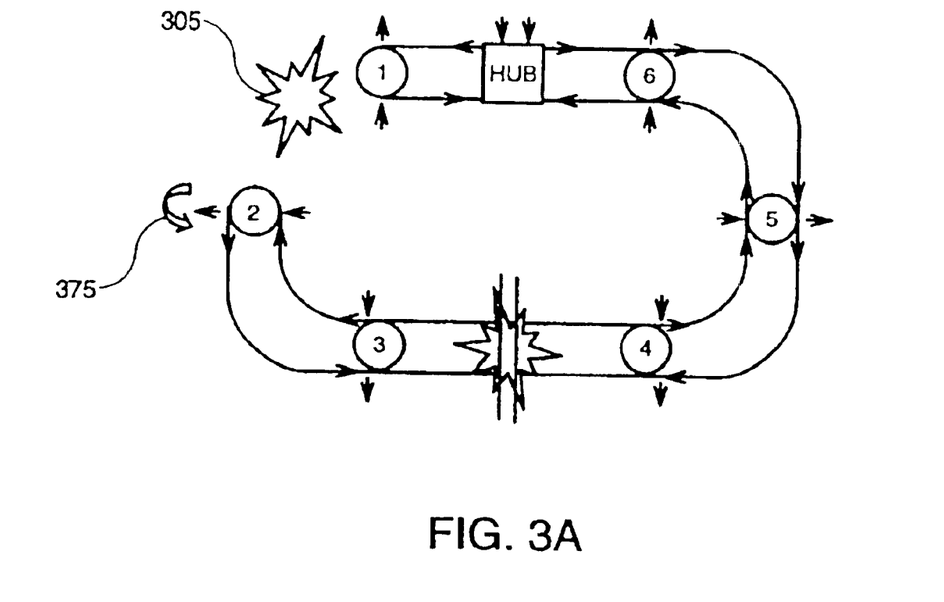
FIGS. 3A and 3B are diagrams showing another way to reconfigure the ring if the optical fiber is broken.
Figure 3B:
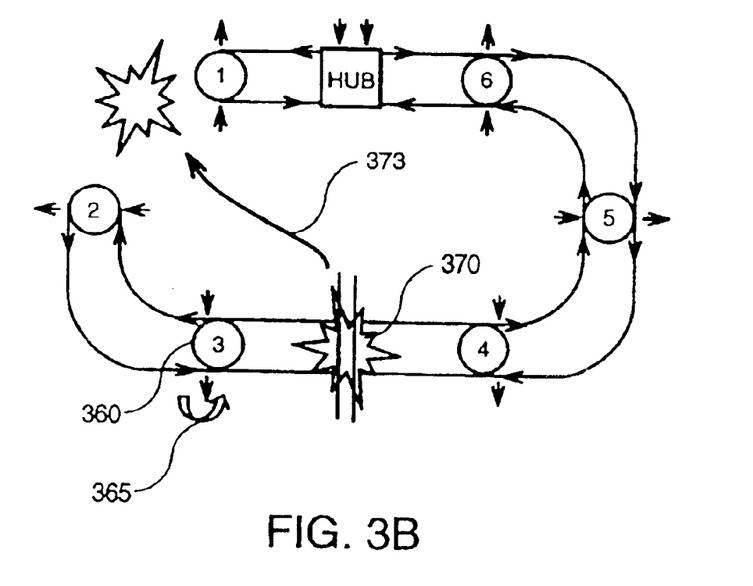

Another and equivalent reconfiguration mode, also involving two steps, is described below with reference to FIGS. 3A and 3B. In this reconfiguration mode it is assumed that the stations can detect whether they are receiving light via the fiber. When they no longer receive light because there is a real break (305) in the fiber between stations 2 and 3, as in the preceding example, the station numbered 2 then automatically reverses the direction of the traffic on the ring (375). This is detected by the next station (360), which also reverses (365) the traffic direction. After this, the virtual break (370) is shifted (373) to coincide with the real break. As in the previous case, reconfiguration is complete at this stage and the traffic between the hub and the stations is fully re-established.

Regardless of the reconfiguration mode, implementing the invention therefore presupposes that the stations are all equipped with respective three-state optical switches (400) each forming a four-pole network (A, B, C, D) whose operating modes are described below with reference to FIGS. 4A, 4B and 4C.

Figure 4A:
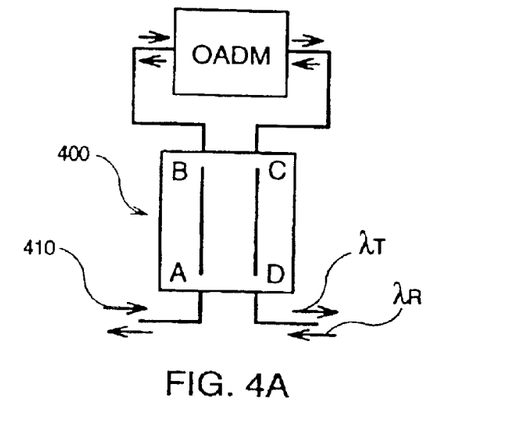
FIGS. 4A, 4B and 4C are diagrams showing a three-state switch of the invention respectively used in direct mode, crossed mode and transparent mode.

FIG. 4A shows a direct mode (410) of circulation of light signals at wavelengths from the two groups $\lambda_T$ and $\lambda_R$ received by the OADM function of the stations, in the direction indicated in FIG. 4A; this mode is the normal traffic mode when the fiber is not broken, as described initially with reference to FIG. 1.

Figure 4B:
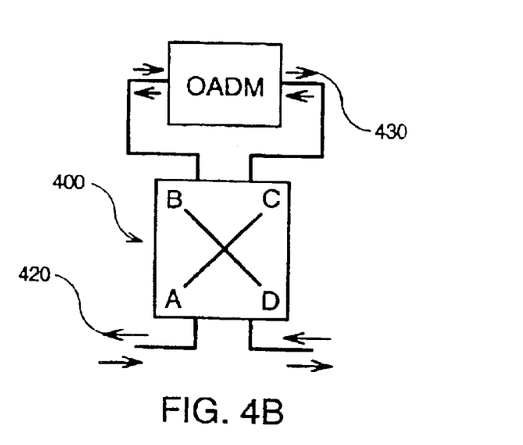

FIG. 4B shows the three-state optical switch in a second state referred to as the crossed state. In this case, the direction in which the signals circulate on the ring is reversed (420), as required to reconfigure it as previously described, whereas the OADM function continues to receive the signals in exactly the same way (430).

Figure 4C:
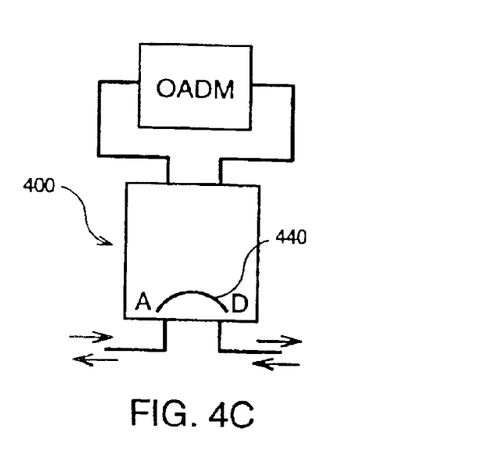

FIG. 4C shows the third state of the optical switch, which here is in a transparent mode (440) with the OADM function of the station disconnected from the ring. Although this operating mode is not strictly necessary to either of the reconfiguration modes described with reference to FIGS. 2 and 3, it isolates a station from the network, for example simply because it is not switched on. The transparent mode is therefore the default idle mode of the optical switch, which does not necessitate any voltage to be applied to it in order to be in this state, and thereby to ensure continuity of the ring. Moreover, this state can be an intermediate state at the time of reconfiguration between the normal mode and the cross mode and vice-versa, in order to facilitate this operation and to provide a period during which the OADM function of a station is effectively isolated for the short time period in which reconfiguration decisions are taken.

Figure 5A:
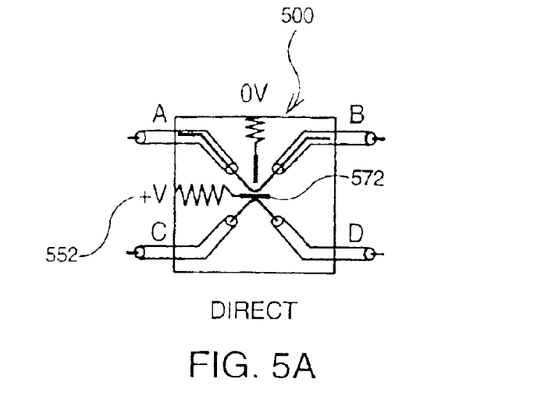
FIGS. 5A, 5B and 5C show a first embodiment of a three-state switch of the invention respectively used in direct mode, crossed mode and transparent mode.
Figure 5B:
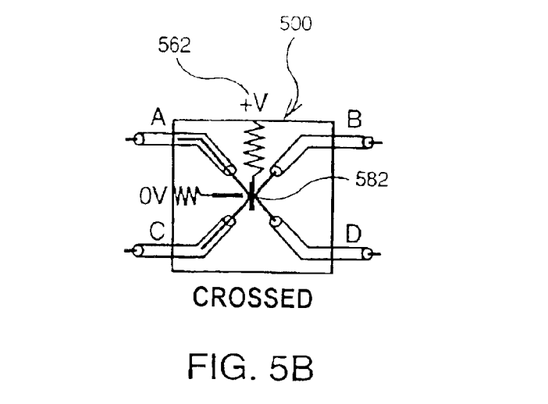
Figure 5C:
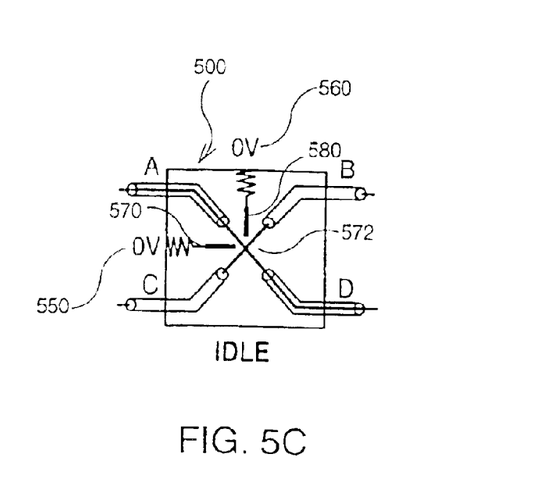

FIGS. 5A to 5C shows more precisely an embodiment of a three-state optical switch (500) suitable for the invention. The now-standard micro-electro-mechanical (MEM) techniques, which have been greatly improved on in recent years and relate to electrically operated mechanical devices of small and very small size, are generally employed. In particular optical switches are used in which mirrors are moved mechanically by the action of an electrical voltage in order to direct light rays accordingly.

In FIG. 5A, a voltage is applied (552) to a horizontal mirror with two reflecting faces that is moved to reflect light from A to B and from C to D. This state of the switch corresponds to the direct mode of operation previously described, and thus to FIG. 4A.

In contrast, in FIG. 5B a voltage is applied (562) to a vertical mirror, which is moved to reflect light from A to C and from B to D. This state of the switch corresponds to the crossed mode of operation previously described, and thus to FIG. 4B.

In FIG. 5C, the switch is idle, in the transparent mode corresponding to FIG. 4C, i.e. light passes freely between the light guides, between A and D and between C and B, without any voltage needing to be applied to control pins (550) and (560). The two mobile mirrors are in their idle positions (570) and (580).

It will of course be noted that the embodiment of an optical switch described above necessarily implies that a voltage is not applied simultaneously to the pins (550) and (560), as this would destroy the switch. This can easily be achieved by using an exclusive-OR logic circuit to prevent simultaneous activation of both mirrors.

Figure 6A:
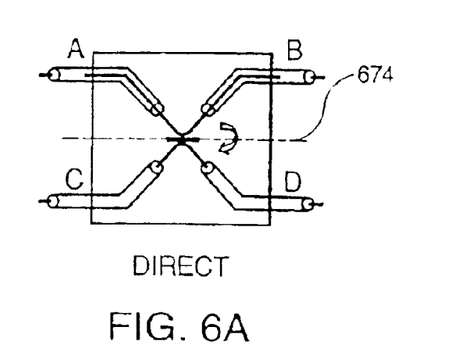
FIGS. 6A, 6B and 6C show a second embodiment of a three-state switch of the invention respectively used in direct mode, crossed mode and transparent mode.
Figure 6B:
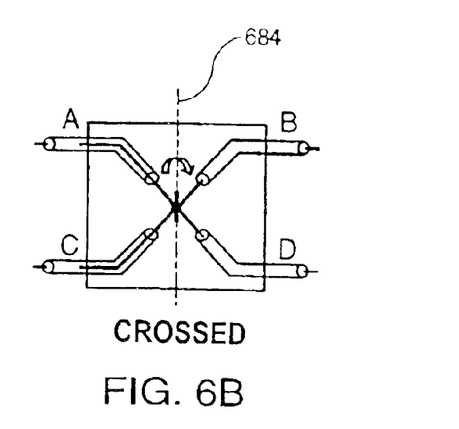
Figure 6C:
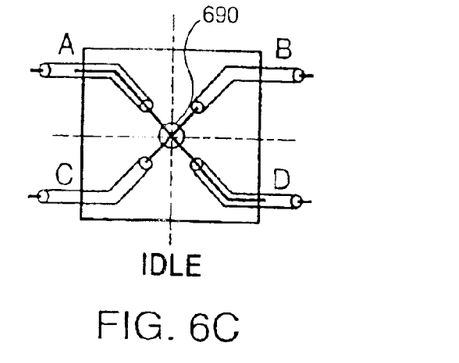

FIGS. 6A, 6B and 6C show a different embodiment of the three-state switch conforming to the invention. Here a single mirror is used and in the idle position the mirror is parallel (690) to the plane of the device represented. As with the preceding embodiment, in idle mode, traffic passes transparently, i.e. light passes freely between A and D and between C and B, without any voltage needing to be applied.

In FIG. 6A, the mirror is rotated about a horizontal axis (674) to obtain the direct mode of the switch and thus the FIG. 4A mode of operation.

In FIG. 6B the mirror is rotated about a vertical axis (684) to obtain the crossed mode of the switch and thus the FIG. 4B mode of operation.

Figure 7A:
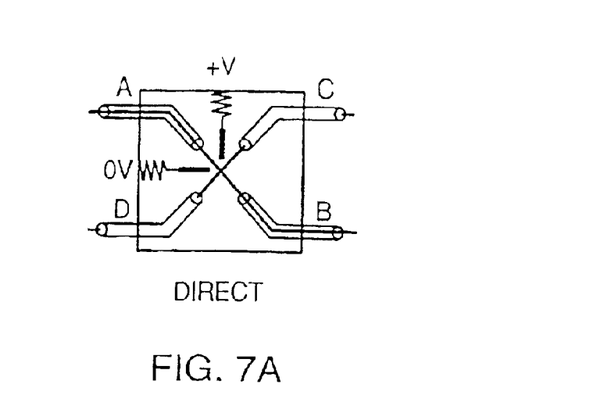
FIGS. 7A, 7B and 7C show a third embodiment of a three-state switch of the invention respectively used in direct mode, crossed mode and transparent mode.
Figure 7B:
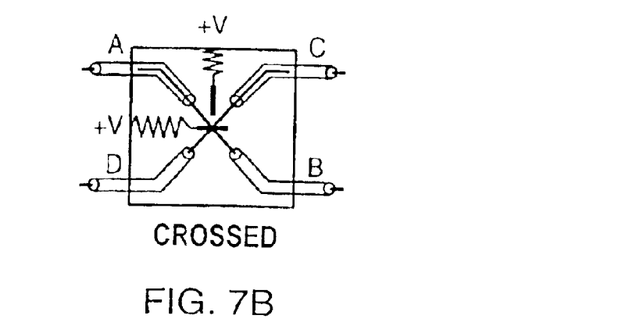
Figure 7C:
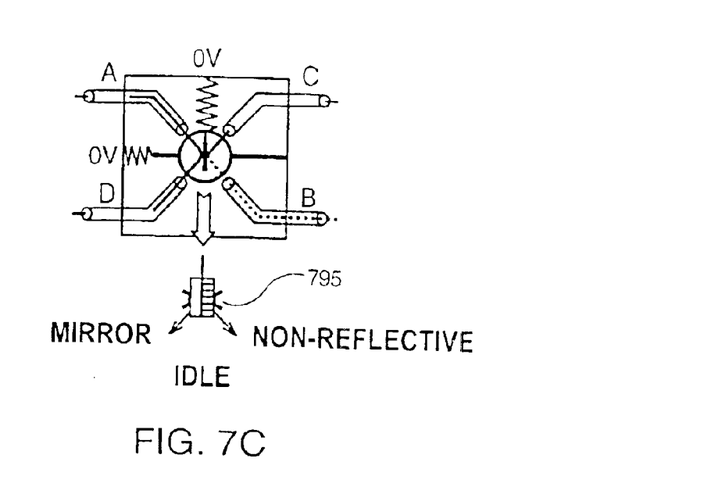

Finally, FIGS. 7A, 7B and 7C show a third embodiment of the three-state switch which is a variant of the first embodiment described with reference to FIGS. 5A to 5C. The improvement relates to the idle mode. Referring to FIG. 4C, it will be noted that in the transparent mode of operation, in which the OADM function is not used, it would be desirable for there to be no communication between the two connections of this function to the optical switch, as shown in this figure. Even if this changes nothing in relation to the operation of the network as described until now, the previous two embodiments do not meet this requirement, and in fact also set up a connection similar to the connection (440) in FIG. 4C. As there is at least one light emitter, i.e. at least one laser, in the OADM function of the station, the energy from the latter is all returned to the optical receivers that are also present in the function. This dazzles them, and can even damage them if the laser is sufficiently powerful. It is therefore advantageous for this return path not to exist, or at least for strong attenuation to be applied. This is the advantage of the third embodiment of the three-state optical switch shown in FIGS. 7A to 7C. It will noted that the vertical mirror has an antireflection face (795) which effectively ensures this attenuation in the return path. It will also be noted that to obtain operation in the crossed mode of FIG. 7B, this third embodiment uses a horizontal mirror whose two faces are reflecting mirrors. The reference letters for the four optical connections denoted A, B, C and D are therefore changed compared to the description of the other two embodiments, which does change in any way the practical use of the device, of course.

What is claimed is:

1. A method of reconfiguring a ring optical network, the ring optical network formed of a single optical fiber (100) and including at least one traffic concentrator (120) and at least one station (140) optically connected to said fiber, the method comprising the steps of:
    sending from said concentrator a light signal over said fiber at a first wavelength from a first group of wavelengths comprising at least one wavelength (110) and receiving at said concentrator a light signal from said fiber at a second wavelength different from said first wavelength from a second group of wavelengths comprising at least one wavelength (150), said concentrator simultaneously sending to and receiving from said at least one station via both ends of said fiber (121, 122) on wavelengths in said first group of wavelengths and on wavelengths in said second group of wavelengths;
    said method further comprising the steps of:
    creating a virtual break (170) on said fiber between said at least one station and said concentrator (120) when said network is established; and
    on detection of a real break (205) in the fiber, shifting (271, 272) said virtual break so that it coincides with said real break (272), so as to re-establish the traffic between said concentrator and said at least one station; and
    wherein said virtual break is created between two of said stations (140, 160) farthest away from said concentrator.

2. A method according to claim 1, wherein the step b) of shifting the virtual break is effected step by step (271, 272) towards the location of the real break (205) in the fiber, starting from the position at which the virtual break was initially created, said step of shifting the virtual break step by step further comprising the following step:
    b1) reversing (265, 275) the direction of the traffic at each station passed through.

3. A method according to claim 1, wherein the method is carried out under the control of said concentrator.

4. A method according to claim 1, wherein in step b) the shifting (373) of said virtual break (370) results from the fact that the following additional steps are effected automatically beforehand for each downstream station, step by step, starting from the real break (305), and continuing as far as the virtual break (370):
    b1) detecting that no light is received from the immediately upstream station, and
    b2) reversing (375, 365) the direction of the traffic.

5. A ring optical network type system comprising means adapted to implement the method according to claim 1; and wherein the system includes a three-state optical switch (400) forming a four-pole network (A, B, C, D), wherein light signals are transmitted between the four poles in any of the following three transmission modes:
    firstly, between the poles A and B and, secondly, between the poles C and D, this corresponding to a direct mode of propagation,
    firstly, between the poles A and C and, secondly, between the poles B and D, this corresponding to a crossed mode of propagation,
    between the poles A and D, this corresponding to a transparent mode of propagation; and
    wherein said three transmission modes are obtained by applying an electrical voltage to one or more pins external to said switch and, in the absence of any applied voltage, said switch is in said transparent mode which is thus the idle mode of said switch.

6. A system according to claim 5, wherein the system includes two mirrors (570, 580), each mirror with two reflecting faces, the two mirrors disposed orthogonally relative to each other and respectively adapted to be moved relative to a horizontal axis (572) and a vertical axis (582) by applying an electrical voltage to one or the other of two external pins (550, 560) of said optical switch.

7. A system according to claim 5, wherein the system includes a single mirror having two reflecting faces and adapted to pivot about two rotation axes, of which one axis (674) is horizontal and the other axis (684) is vertical.

8. A system according to claim 5, wherein the system includes two mirrors disposed orthogonally relative to each other and respectively adapted to be moved relative to a horizontal axis and a vertical axis by applying an electrical voltage to one or the other of two external pins of said optical switch; and wherein at least one of said two mirrors has an anti-reflection face (795) so that light cannot be transmitted between the poles B and C of said four-pole network, or is strongly attenuated, in said transparent mode, which is the idle mode of said switch.

9. An optical network system, comprising:

an optical fiber forming a ring;

a traffic concentrator optically coupled to the fiber; and a plurality of stations optically coupled to the fiber; and wherein the system is configured such that a light signal is sent from the concentrator over the fiber at a first wavelength from a first group of wavelengths comprising at least one wavelength and a light signal is received at the concentrator from the fiber at a second wavelength different from said first wavelength from a second group of wavelengths comprising at least one wavelength;

wherein the concentrator simultaneously sends to and receives from at least one station via both ends of the fiber light signals on wavelengths in the first group of wavelengths and on wavelengths in the second group of wavelengths; and wherein a virtual break is created on the fiber between at least two stations when the network is established; and wherein the system is configured such that upon detection of a real break in the fiber, the virtual break shifts so that it coincides with the real break and traffic is reestablished between the concentrator and the stations; and wherein the system is configured such that when there is no real break, the virtual break is located between two stations farthest away from the concentrator.

10. The system of claim 9, wherein the virtual break prevents all light signals on the fiber from crossing the virtual break.

11. The system of claim 10, wherein the virtual break is created by optical switches having a mirror.

12. The system of claim 9, wherein each station is an optical add/drop multiplexer.

* * * * *